(12) United States Patent
Hertenstein (10) Patent No.: US 8,438,539 B2
(45) Date of Patent: May 7, 2013

(54) USING A MENU SLIDESHOW FRAMEWORK FOR GENERATING A CUSTOM MENU-DRIVEN SLIDESHOW CONTAINING DEFINABLE CONTENT

(75) Inventor: David Hertenstein, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 1426 days.

(21) Appl. No.: 12/101,666

(22) Filed: Apr. 11, 2008

(65) Prior Publication Data

US 2009/0259988 A1 Oct. 15, 2009

(51) Int. Cl.
*G06F 9/44* (2006.01)

(52) U.S. Cl.
USPC .......... 717/120; 717/108; 717/110; 717/113; 717/117

(58) Field of Classification Search .................. None
See application file for complete search history.

(56) References Cited

U.S. PATENT DOCUMENTS

| | | | | |
|---|---|---|---|---|
| 4,821,220 A * | 4/1989 | Duisberg | .......................... | 703/2 |
| 5,668,998 A * | 9/1997 | Mason et al. | ................. | 717/104 |
| 5,912,666 A * | 6/1999 | Watson et al. | ................ | 715/856 |
| 6,345,383 B1 * | 2/2002 | Ueki | ............................. | 717/124 |
| 6,738,075 B1 | 5/2004 | Torres et al. | | |
| 6,738,964 B1 * | 5/2004 | Zink et al. | ..................... | 717/105 |
| 7,127,679 B2 | 10/2006 | Cohen | | |
| 7,240,323 B1 * | 7/2007 | Desai et al. | .................. | 717/100 |
| 7,451,432 B2 * | 11/2008 | Shukla et al. | ................ | 717/106 |
| 7,458,062 B2 * | 11/2008 | Coulthard et al. | ........... | 717/121 |
| 7,954,050 B2 * | 5/2011 | Maryka et al. | ................ | 715/234 |
| 2003/0004983 A1 * | 1/2003 | Cohen | .......................... | 707/500 |
| 2004/0072611 A1 * | 4/2004 | Wolf et al. | ...................... | 463/20 |
| 2004/0125128 A1 | 7/2004 | Chang et al. | | |
| 2005/0091576 A1 * | 4/2005 | Relyea et al. | ................. | 715/502 |
| 2006/0074736 A1 * | 4/2006 | Shukla et al. | ..................... | 705/8 |
| 2006/0080592 A1 * | 4/2006 | Alves de Moura et al. | ......................... | 715/501.1 |
| 2006/0123360 A1 * | 6/2006 | Anwar et al. | ................. | 715/810 |
| 2006/0161635 A1 * | 7/2006 | Lamkin et al. | ................ | 709/217 |
| 2006/0206882 A1 * | 9/2006 | Illowsky et al. | .............. | 717/144 |
| 2007/0157114 A1 | 7/2007 | Bishop et al. | | |
| 2008/0104527 A1 * | 5/2008 | Jaeger | .......................... | 715/763 |
| 2008/0163121 A1 * | 7/2008 | Lee et al. | ...................... | 715/845 |
| 2011/0113314 A1 * | 5/2011 | Greer et al. | ................... | 715/202 |

OTHER PUBLICATIONS

Title: Modeling and efficient optimization for object-based scalability and some related problems, author: Batra, P, source: IEEE, dated: 2000.*

(Continued)

*Primary Examiner* — Chameli Das
(74) *Attorney, Agent, or Firm* — Patents on Demand P.A.; Brian K. Buchheit; Scott M. Garret (57) ABSTRACT

A computer program product that includes a project object. The project object can be configured for linearly organizing a series of custom self-contained content. The project object can be a compliable object that includes at least one menu framework object and a set of project data objects. The menu framework object can define a menu. The menu framework object conforms to a standardized menu slideshow framework. The standardized menu slideshow framework can be a reusable templated framework. Each of the project data objects can include a self-contained content object. Each self-contained content object can be programmatically linked to the menu framework object without modifying source code of the self-contained content object. The menu framework object can define a linear ordering of the set of project data objects.

8 Claims, 3 Drawing Sheets

OTHER PUBLICATIONS

Title: Presentation layer framework of Web application systems with server-side Java technology, author: Saimi, A et al, source: IEEE, dated: 2000.*

Weber, A., et al., "Live Documents with Contextual Data-Driven Information Components", ACM Special Interest Group for Design of Communication, Oct. 2002.

Crescenzi, P., et al. "Development of an ECB on Computer Networks Based on WWW Technologies, Resources and Usability Criteria", IEEE Xplore, vol. 2, pp. 1198-1202, Dec. 2002.

Hakim, J., et al., "Sprint: Agile Specifications in Shockwave and Flash", Designing for User Experiences, 2003.

* cited by examiner

FIG. 1

Menu Slideshow Framework Development Interface 202

```
import DemoSlideShow;
import SSNav;
import MenuFormat;
import NavMenu;

var Lowes_ss:DemoSlideShow = new DemoSlideShow(_root.content_mc, _root.content_mc.default_mc,
"Customer Demo");

var Lowes_ssN:SSNav = new SSNav(Lowes_ss, _root.content_mc, _root.navbar_mc,
        _root.navbar_mc.navControl_mc.leftArrow_mc, _root.navbar_mc.navControl_mc.rightArrow_mc,
        _root.navbar_mc.navControl_mc.prev_btn, _root.navbar_mc.navControl_mc.next_btn,
        _root.navbar_mc.navControl_mc.slide_txt, _root.navbar_mc.navControl_mc.slideTotal_txt,
        _root.navHide_btn, ["LEFT","UP"], ["RIGHT","DOWN"]);
var Lowes_mf1:MenuFormat = new MenuFormat("lowes", 20, 5);
var Lowes_mf2:MenuFormat = new MenuFormat("lowes", 20, 5);
var Lowes_mf3:MenuFormat = new MenuFormat("lowes", 20, 5);
var Lowes_mf4:MenuFormat = new MenuFormat("lowes", 20, 5);
```

Configuration View

Deploy Target: Web    Slideshow Name: Customer Demo

Content:

| Filename | Caption |
|---|---|
| Slide1.jpg | Ease of Use |
| Slide2.jpg | Security |
| Slide3.jpg | Changes in Version 3.0 |
| Slide4.jpg | Conclusion |

↑ ↓ X

Add...

Theme:

| Theme |
|---|
| Colorful |
| Black & White |
| USA |
| Science |

Add  Edit  Delete

Menu Placement: Bottom

Build  Preview  Cancel

USING A MENU SLIDESHOW FRAMEWORK FOR GENERATING A CUSTOM MENU-DRIVEN SLIDESHOW CONTAINING DEFINABLE CONTENT

REFERENCE TO COMPUTER PROGRAM LISTING

The present application includes a computer program listing referred to as Appendix A which is being submitted in accordance with MPEP §1.96(c). The referenced computer program listing, Appendix A, is being submitted separately on a compact disc. A duplicate copy of the compact disc is also being submitted. The computer program listing included on both compact discs is entitled CHA9-2008-0001US1_Appendix_A.doc, and is incorporated herein by reference.

BACKGROUND OF THE INVENTION

The present invention relates to the field of slideshow presentations, more particularly, to using a menu slideshow framework for generating an organized menu-driven slideshow containing definable content.

Slideshows permit a presentation of a series of images and media, which is often done for artistic or instructional purposes. Traditionally, slideshows were presented using a slide projector or overhead projector, but in more recent times, slideshows have become more widely used on a computer running presentation software. These computerized slideshows are often more dynamic than their less sophisticated counterparts, which provides a myriad of new interactive opportunities and dynamic presentation options.

Often, presenters of flash content want finer grained control on the configuration and interactivity of a flash based (e.g., ADOBE FLASH) presentation than is possible using existing solutions. For example, a flash presentation can represent a graphical user interface (GUI) of a software prototype, within which a user can select flash buttons, menus, toolbars, and the like. Interactive flash presentations are not limited to software prototypes but can be used in any context, such as showing an interactive manufacturing process, a decomposable product, and the like. For these purposes, a user often wants to display configurable and selectable menus, inclusive with pop-ups.

At present, to implement a menu-driven slideshow in a multimedia toolset such as ADOBE FLASH, a user would have to first create code to create and manage the slideshow's menus, including writing code for each individual action. This can be quite time consuming and require a certain level of expertise in using FLASH. Because of the amount and level of code required, it is common to "hard-code," or set configurable options at the code level. Hard-coding can reduce required coding, but will limit the re-usability of the code used for the slideshow. In the event that the code was re-used, additional time would be required to change the options that were hard-coded. Further, current practices limit an accessibility of configurable menus to a user population having code-level flash manipulation tools and having at least a moderate level in coding flash content, which places custom menuing of slideshows beyond a competency level of many potential users.

BRIEF SUMMARY OF THE INVENTION

One aspect of the present invention can include a method, apparatus, computer program product, and system for menuing self-contained media objects. A templated project file and a set of class files can be identified. The templated project file and the set of class files can be reusable files conforming to a menu slideshow framework. Custom self-contained content objects can be added to a project source file. A source code object of the project source file can be identified. The source code object can include calls binding the custom self-contained content objects to the classes specified by the class files. Arguments conveyed within the calls can define a linear ordering of the custom self-contained content objects. Advancement from one linearly ordered object to another can be interactively possible using menu options, functionality for the menu options being provided by the templated project file and the set of class files. The project source file can be compiled to create an executable project software object. The compiling can use the templated project file, the plurality of class files, the custom self-contained content objects, and the source code object.

Another aspect of the present invention can include a computer program product that includes a project object. The project object can be configured for linearly organizing a series of custom content. The project object can include at least one menu framework object and a set of project data objects. The menu framework object can define a menu. The menu framework object can conform to a standardized menu slideshow framework. The standardized menu slideshow framework can be a reusable templated framework. Each of the project data objects can include a self-contained content object. Each self-contained content object can be programmatically linked to the menu framework object without modifying source code of the self-contained content object. The menu framework object can define a linear ordering of the set of project data objects.

Still another aspect of the present invention can include a computer program product including at least one code object written in an object oriented language that defines at least one class. The at least one class providing reusable menuing functionality for menus configured to interactively navigate among a plurality of linearly ordered self-contained software objects. The one or more classes are configured to be imported into a source file. The source file can be configured to be placed in a project file that also includes a plurality of custom linearly ordered self-contained software objects. These self-contained software objects can be bound to interactive menus having functionality provided by the at least one class.

DETAILED DESCRIPTION OF THE INVENTION

The present invention discloses a menu slideshow framework (MSF), which can be an add-on for an existing software development language to allow easy creation of an organized menu-driven slideshow containing definable content. Software frameworks are collections of code used to provide an enhanced functionality. The MSF can contain all the code needed to create, display, and operate a slideshow. A configurable code file conforming to the MSF can vary from project to project, which can result in changes to menu labels, menu behavior, menu layout, color schemes, menu font, and the like. The source code (e.g., flash content) can be developed separate from the MSF code. Changing the parameters and content used in the generated slideshow (i.e., changing MFS options and parameters) can be quickly achieved by modifying the definitions contained in the configurable code file. In one embodiment, an add-on for an integrated development environment (IDE) for the MSF is contemplated. This IDE add-on can be used to generate an appropriate configurable code file to generate a slideshow with the specified options. Thus, a custom slideshow for flash content can be created without necessarily modifying flash based code, but by instead by selecting MSF based settings within a GUI IDE environment.

The slideshow that uses the MSF can be generated in any number of ways, depending on the specifics regarding its implementation. In one implementation, the MSF can provide a templated flash project files for organizing a definable series of flash content as well as a templated set of actionscript calls, which allow a developer to define slide ordering, keystroke navigation definitions, color scheme, and dynamically drawn menu system. In another embodiment, the slideshow can be generated in such a way to require presentation software for presenting the slideshow. Further, the MSF can be embedded into the generated slideshow (statically linked), or the MSF can be required to exist separately (dynamically linked).

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory), a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
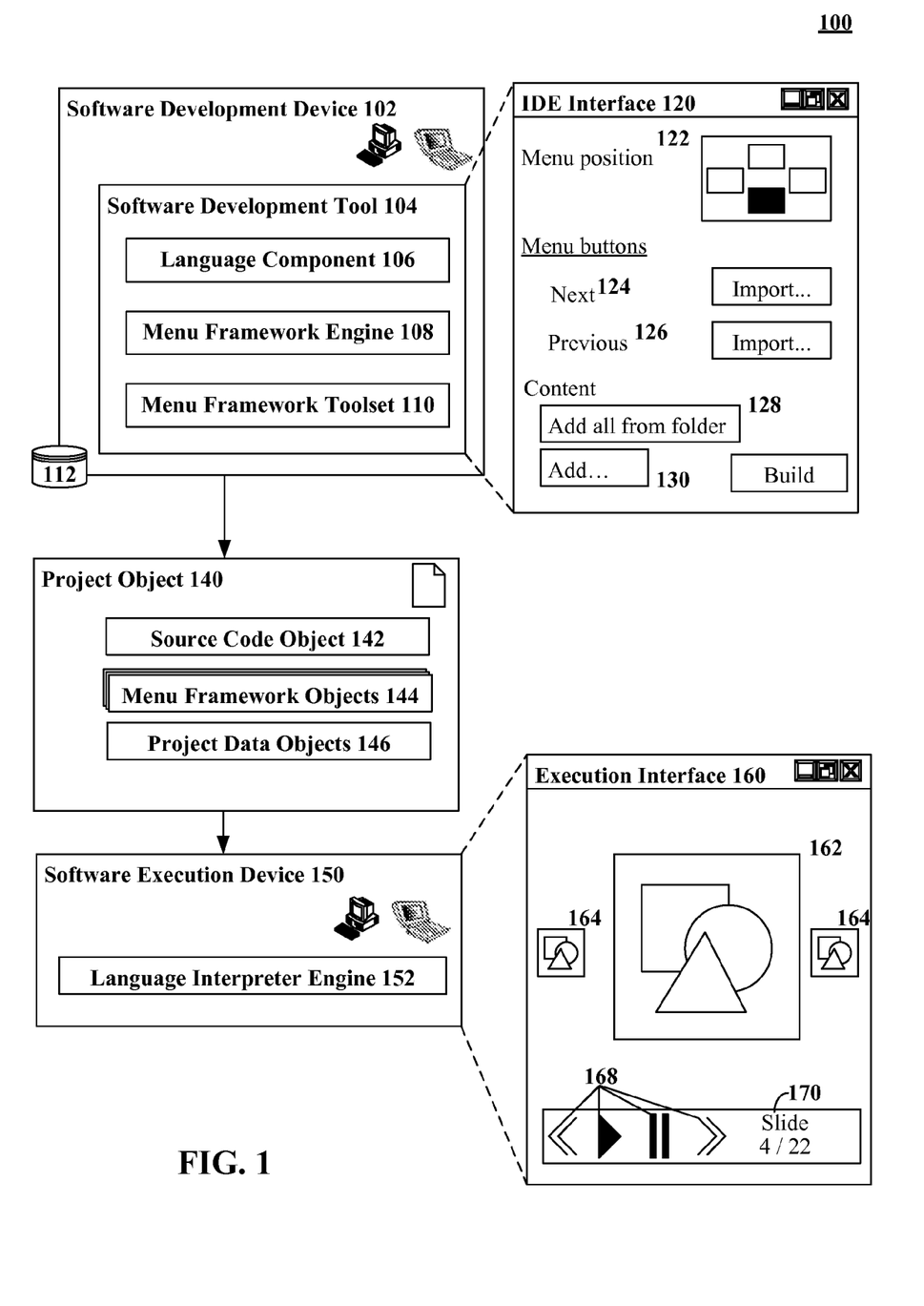
FIG. 1 is a schematic diagram of a system for using a menu slideshow framework for generating an organized menu-driven slideshow containing definable content in accordance with an embodiment of the inventive arrangements disclosed herein.

FIG. 1 is a schematic diagram of a system 100 for using a menu slideshow framework (MSF) for generating an organized menu-driven slideshow containing definable content in accordance with an embodiment of the inventive arrangements disclosed herein. In system 100, software development device 102 can be used to generate an organized menu-driven slideshow (project object 140) using software development tool 104. Project object 140 can include source code object 142, menu framework objects 144, and project data objects 146. Source code object 142 can be the generated source code that makes use of the unchanging code supplied by menu framework objects 144. Software development tool 104 can include language component 106, menu framework engine 108, and menu framework toolset 110.

IDE interface 120 can illustrate a sample integrated development environment (IDE) interface for customizing the generated project object 140. Project object 140 can be the generated slideshow created using software development tool 104. In one embodiment, language interpreter engine 152 can be required for software execution device 150 to run project object 140. In another embodiment, the object 140 can be self-executing (not requiring interpreter 150). Execution interface 160 can illustrate a possible interface presented by the execution of project object 140. Thus, using system 100 and the MSF, a flash developer can create a menu-driven slideshow presentation for a prototype demonstration or any series of custom content that can be organized in a linear fashion.

To elaborate using a flash based embodiment, the MSF provides a templated flash project file (e.g., object 140) for organizing a series of flash content in an efficient and easy to use way, as well as a templated set of actionscript calls, which allow the developer to define the slide ordering, keystroke navigation definitions, color scheme, and dynamically drawn menuing system. The menu system that is defined in the project file can be dynamically drawn, can permit auto-hiding, can allow for custom color definitions, and can have sub-menu capabilities.

Hence, in the above embodiment, the MSF allows the developer to define menu items and labels using a succinct template of actionscript calls from a single place in the flash project file. In this way, the developer can define the menu system and presentation ordering, such as using simple text strings as arguments to framework class files. The framework classes can, in turn, take these arguments when the project file is compiled and can dynamically create the entire menu system, with correct widths, heights, horizontal and vertical spacing, user defined padding and color scheme, keyboard navigation, and content loading and unloading artifacts. In other words, the developer can create a presentation (interface 160) that includes a menu system for jumping from/to any developer defined point of a presentation. The developer can use the MSF and menus created using the MSF to easily modify the look, feel, wording, spacing, and content using single, straight forward actionscript calls organized in a singular place in the project code. It should be appreciated that the MSF is not limited to a flash based implementation and the concepts provided herein can easily be adapted to any of a variety of other content types.

As used herein, software development device 102 can be any computing device capable of running software development tool 104 to allow the creation of an organized menu-driven slideshow. Software development device 102 can include data store 112. Data store 112 can store software development tool 104, the generated menu-driven slideshow (project object 140), the content to be embedded in the generated slideshow, and the like. Software development device 102 can be any computing device, including, but not limited to, a workstation, a desktop computer, a laptop computer, a thin client, or the like.

Software development tool 104 can be a software application for developing software. Software development tool 104 can be any application capable of generating a menu-driven slideshow as described herein. Software development tool 104 can include language component 106, menu framework engine 108, and menu framework toolset 110. Software development tool 104 can be any software development application including, but not limited to, ADOBE FLASH, DELPHI, MICROSOFT VISUAL STUDIO, or the like.

Language component 106 can be an embedded component of software development tool 104 to interpret the programming or scripting language or languages supported by software development tool 104. Language component 106 can act as either an interpreter or translator. When acting as an interpreter, source code for the language or languages supported by software development tool 104 can be stored verbatim and a language interpreter can be required to execute the stored code. When acting as a translator, language component 106 can translate the written code into machine-readable code for execution without the use of a language interpreter.

Menu framework engine 108 can include the code objects that create the menu slideshow framework. These code objects can be independent of other code or can rely on other frameworks to operate. When software development tool 104 generates a menu-driven slideshow, the source code generated can use the code in menu framework engine 108 to create and run the slideshow.

In one embodiment, menu framework toolset 110 can be an application add-on for software development tool 104 to allow the automatic generation of source code for the menu-driven slideshow. Menu framework toolset 110 can allow for any arbitrary level of customization of the generated menu-driven slideshow. For example, the included content can be specified, the buttons on the menu can be specified, color schemes can be selected, and the like. Menu framework toolset 110 can generate an interface as illustrated by IDE interface 120. In some embodiments, menu framework toolset 110 can be omitted and the menu framework engine 108 can be implemented by the manual writing of source code.

Data store 112 can be physically implemented within any type of hardware including, but not limited to, a magnetic disk, an optical disk, a semiconductor memory, a digitally encoded plastic memory, a holographic memory, or any other recording medium. The data store 112 can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

Project object 140 can be the menu-driven slideshow generated by software development tool 104. Project object 140 can include source code object 142, menu framework objects 144, and project data objects 146. This illustrates an embodiment in which static linking is used. In some embodiments, static linking can be the only option or cannot be an option, depending on the limitations of the language or languages supported by software development tool 104 and used to generate project object 140. When static linking is used, menu framework objects 144 can be embedded into project object 140 so it is usable at runtime. In the situation where dynamic linking is used or available, menu framework objects 144 must be present on software execution device 150 at runtime and would not be embedded in project object 140.

Source code object 142 can be the generated source code by menu framework toolset 110. Source code object 142 can be the varying source code file coded in the supported language of software development tool 104. Source code object 142 can implement each of the code objects contained in menu framework engine 108. Source code object 142 can contain all of the customizations made for the generated menu-driven slideshow. These customizations can include, but are not limited to, the name of the slideshow, menu position, order of slides, and the like.

Menu framework objects 144 can be a generated set of the code objects contained in menu framework engine 108 to be used at runtime by software execution device 150. In some embodiments, menu framework objects 144 can be exactly the same as menu framework engine 108, however this cannot be the case. For example, menu framework objects 144 can be a version of the code objects embedded in menu framework engine 108 with or without debugging symbols. Menu framework objects 144 can be customized and/or optimized for the target of deployment.

Project data objects 146 can include the slideshow assets, such as content, needed by the generated menu-driven slideshow. Project data objects 146 can be specified using an interface associated with menu framework toolset 110. In some embodiments, project data objects 146 can be re-encoded or translated versions of the original content provided on software development tool 104. Project data objects 146 can include any necessary data for the slideshow, including, but not limited to, slide content, style data, replacement menu buttons, slide captions, and the like.

Software execution device 150 can be any computing device capable of executing project object 140. Software execution device 150 can include language interpreter engine 152 to interpret the code provided in project object 140. Software execution device 150 can be a desired deployment platform for project object 140. It is contemplated that in some embodiments, software execution device 150 can be located remotely and can receive project object 140 via a network. Software execution device 150 can be any computing device, including, but not limited to, a mobile phone, a web server, a desktop computer, a laptop computer, a personal data assistant (PDA), or the like.

Language interpreter engine 152 can be a software application that can interpret code provided in project object 140 into machine-readable instructions to allow the execution of project object 140. In some embodiments, where the software language being used is translated rather than interpreted, language interpreter engine 152 can be omitted. Language interpreter engine 152 can include, but is not limited to, ADOBE FLASH PLAYER, PERL, PYTHON, RUBY, or the like.

IDE interface 120 can illustrate a sample interface that can be provided by menu framework toolset 110. Interface 120 can include menu position 122, next 124, previous 126, add all from folder 128, and add 130. Menu position 122 can be an option that can allow a user to specify the placement of the menu. In the illustrated example, the user can designate to place the menu at the top, bottom, left, or right side of the slideshow, and the bottom has been selected. Next 124 can be an option that can allow a user to replace the next slide button on the menu bar of the slideshow. Previous 126 can be an option that can allow a user to replace the previous slide button on the menu bar of the slideshow. Add all from folder 128 can be a button that can allow a user to specify a folder containing files to be added as content for the slideshow.

Execution interface 160 can illustrate a sample interface of the generated slideshow at runtime of software execution device 150. Execution interface 160 can include slide display 162, thumbnails 164, menu buttons 168, slide display 170, and the like. Slide display 162 can be the viewing area of the current slide. Thumbnails 164 can be small representations of the previous and next slides. Buttons 168 can be the control buttons provided on the slideshow menu. Buttons 168 can include any number of control buttons, including (as shown in order) previous slide, play, pause, and next slide. Slide display 170 can be a textual representation showing the current slide. In some embodiments, slide display 170 can also show the slide's caption if one has been specified.

The menus of interface 160 can represent any of a variety of interface controls, which the system 100 is able to implement. Menus can include, for example, application menus, pop-up menus, toolbars, ribbons, and the like. Further, placement of the menus can be runtime configurable in accordance with user definable settings. The menu code can be implemented in accordance with the MSF, which is distinct from source code of flash objects, for which the menus are utilized. Additionally, although shown as a graphical user interface 160, the menus provided by the MSF are not so limited and can be used in a multi-modal context (where the MSF provides voice activate-able menus) or can be used in a voice user interface context.

It should be appreciated that not every interface 160 needs to include each of the illustrated menu interface items and that additional interface items other than those shown can also be included. For example, in one contemplated embodiment, an interface can include a display 162, a slide display 170, a forward and backward advancement control (a subset of shown buttons 168), as well as a menu with user configured labels (not shown). The menu can be selectable/expandable and different menu expansion options can be linked to sub-menus. Selection of a terminal menu option can change the display 162 in accordance with code linked to that terminal menu option.

A terminal menu option (or terminal node of the menu structure) can be linked to a multimedia object, such as a movie clip, audio, FLASH content, images, and the like. Selection of such a terminal node can cause the linked content to be presented in display section 162, which is designed to handle a variety of multimedia objects and formats. Terminal nodes of a menu structure can also be linked to external files, which are launched upon a selection of the terminal node. When a linkage exists between the external file and the terminal menu node, a placeholder can be displayed with the menu button label to indicate that the menu option is linked to an external file. For example, a POWERPOINT presentation and/or slide, which requires an instantiation of a POWERPOINT application, can be linked to a terminal node of a FLASH based menu structure of a FLASH based interface 160.

When menus and submenu's are presented in interface 160, a placement of submenus can be dependent on a longest text label in a parent menu. Additionally, when changes are made to the parent menu text labels, the submenus can be automatically repositioned using the MSF. In other words, the MSF builds all the menu objects dynamically and handles placement, sizing, hit areas, etc. based upon values of passed arguments, which include text labels and linkages. In absence of the MSF, a FLASH developer may be required to re-code menu and submenus, if even a single menu label changes.

To illustrate, in a given project, a parent menu positioned at a screen bottom (based upon a MSF setting) in interface 160 can include selectable menu items positioned at a screen bottom for: "Overview," "Prototype Story", "Process Views," and "Key Concepts." Selection of "Prototype Story" can call up a related set of menu option (expanded upwards from the "Prototype Story" item) of: "Prototype Overview" "Customer Purchase Inquiry," "Collaboration Between Company and Customer," "Prepare Quote," "Quote Acceptance," "Execute Work," and "Follow-up." Selection of the item "Prepare Quote" can result in a presentation of a submenu to the right of the selected item. A top left corner of the submenu can be positioned at a top right corner of the "Prepare Quote" item—which has a length determined by the longest menu item; in this case the "Collaboration Between Company and Customer" item. The submenu can include items of: "Specialists Gives Input to Quote," "Agent prepares for Appointment Based on Input," "Quote Finalized at Customer Meeting." Creation and behavior of all of these menus, as well as linkages can be established by passing a set of values to the MSF. The core functionality for the menu implementation and functionality is performed automatically by the MSF, as opposed to requiring custom coding.

Figure 2:
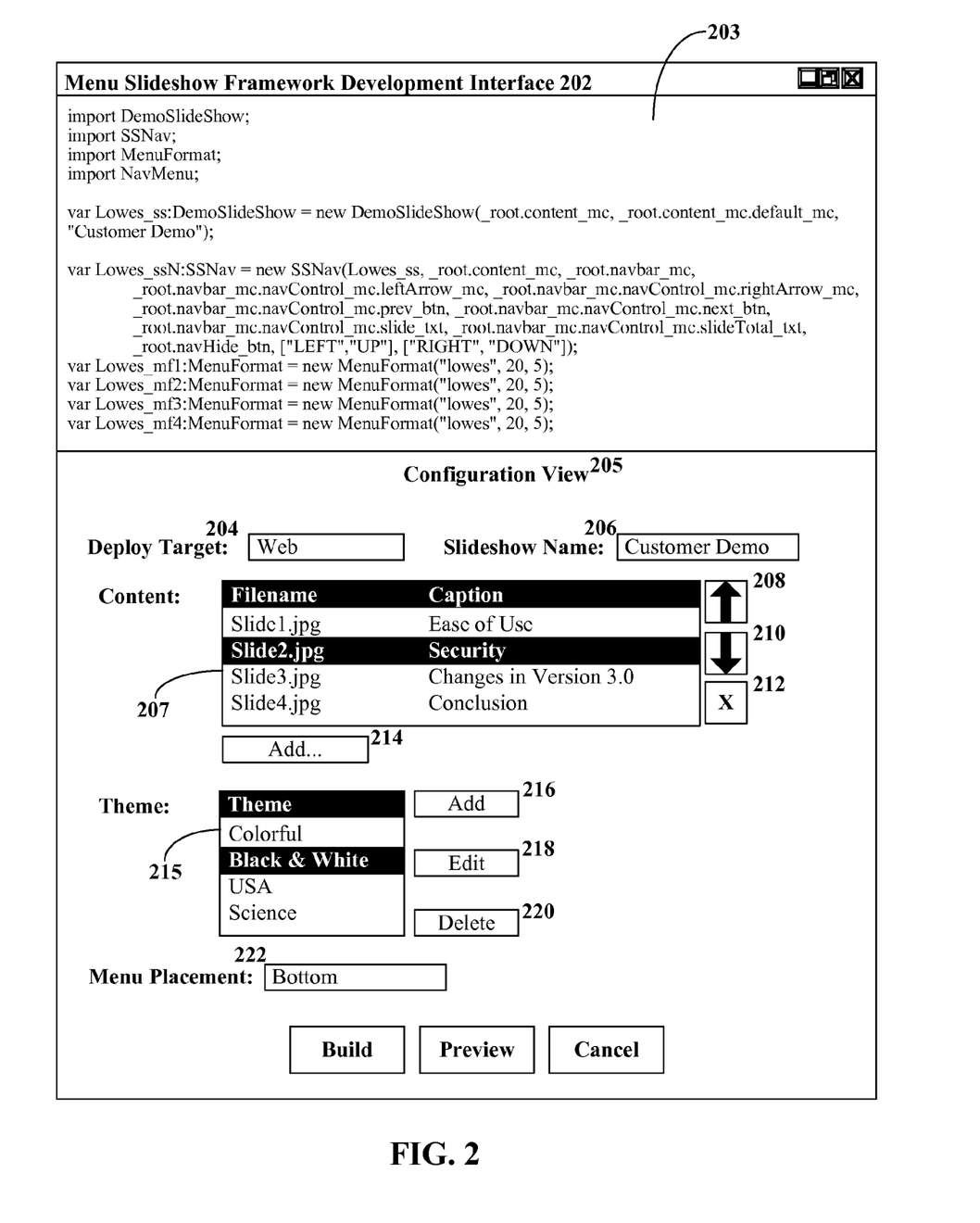
FIG. 2 illustrates a development interface for using a menu slideshow framework for generating an organized menu-driven slideshow containing definable content in accordance with an embodiment of the inventive arrangements disclosed herein.

FIG. 2 illustrates a development interface 202 for using a menu slideshow framework for generating an organized menu-driven slideshow containing definable content in accordance with an embodiment of the inventive arrangements disclosed herein. Interface 202 can be an interface used in context of system 100. Specifics of the interface 202 are provided to illustrate concepts of the MSF only and are not intended as a limitation of the invention disclosed herein. For example, layout, elements, functionality, and the like shown in interface 202 can vary from implementation to implementation without affecting the core of the MSF.

Interface 202 can be an example development interface that can be used to automatically generate source code for a menu-driven slideshow using a menu slideshow framework. Interface 202 can include code view 203, which can be a representation of the code being generated by the settings specified in the configuration view 205. In some embodiments, as configuration options are updated, code view 203 can be updated to reflect the changes. Configuration view 205 can include a number of options 204-222. Option 204 can allow the user to specify the target in which the slideshow will be deployed to. Option 204 currently shows the web as the deployment target, but can be set to any option, including, but not limited to, a mobile phone, a web server, a local data store, or the like. Option 206 can allow the user to specify a name for the slideshow. Option 220 can be an option that can allow the user to select on which section of the screen the menu will be displayed. As shown, the user has selected to display the menu at the bottom of the slideshow.

Options 208-212 can be used to interact with the content listed in list control 207. List control 207 can present a list of the current content items added to the slideshow. A user can select a content item in list control 207 and use button 208 to move the content item up in order. A user can select a content item in list control 207 and use button 210 to move the content item down in order. Button 212 can be used after selecting a content item in list control 207 to delete the item. Button 214 can be used to present a new dialog for adding a new content item. It is contemplated that other buttons can be presented in conjunction with list control 207 for more functionality. For example, a modify or rename button can be included. It is also contemplated that a user could rename the caption of a content item by clicking, or double-clicking, the caption field for the content item.

Options 216-220 can be used to interact with the themes listed in list control 215. List control 215 can present a list of the current usable themes. A theme can include settings for all the visual elements of the slideshow besides the content. Such settings can include, but are not limited to, background color, menu buttons, font and font size, placement of the buttons and/or displays, and the like. A user can select a theme in list control 215 and use button 218 to present a new dialog to allow the user to modify the selected theme. A user can select a theme in list control 215 and use button 220 to delete the selected theme. A user can use button 216 to present a dialog for creating a new theme. The themes listed in list control 215 can be modular and come with the slideshow, or user created. In some embodiments, a hyperlink can be displayed with a link to download new themes for the framework.

Figure 3:
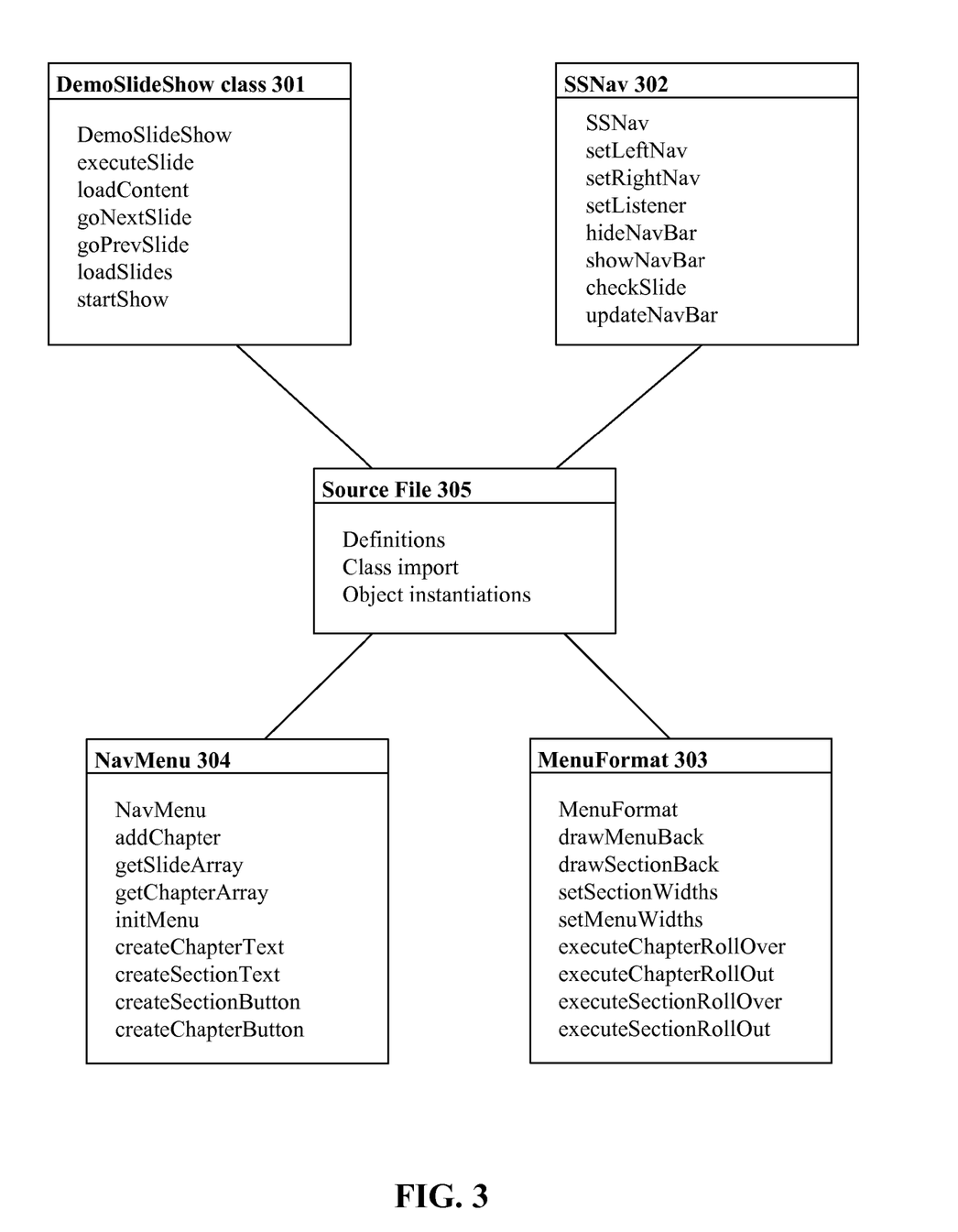
FIG. 3 is a diagram of the embedded classes of an example menu slideshow framework for generating an organized menu-driven slideshow containing definable content in accordance with an embodiment of the inventive arrangements disclosed herein.

FIG. 3 is a diagram of the embedded classes of an example menu slideshow framework written in ACTIONSCRIPT for ADOBE FLASH for generating an organized menu-driven slideshow containing definable content in accordance with an embodiment of the inventive arrangements disclosed herein. More specifically, FIG. 3 includes DemoSlideShow class 301, SSNav class 302, NavMenu class 304, MenuFormat class 303, and source file 305. Source file 305 can be the generated source code in context of source code object 142 of system 100. Classes 301-304 can be in the context of menu framework objects 144 of system 100.

DemoSlideShow class 301 can be the code object that controls slide functionality. Class 301 can include its constructor, DemoSlideShow, which can initialize its member variables and settings. Class 301 can use loadContent and loadSlides to load the content of the current slides. loadContent can be used to load content for a specific slide into view and loadSlides can load a collection of slides into the DemoSlideShow. executeSlide can clear a view, can check for the content type (e.g., FLASH, POWERPOINT, etc.), and can execute loadContent or open an external POWERPOINT file. goNextSlide and goPrevSlide can be functions called by the navigation objects in the menu. goNextSlide and goPrevSlide can be assigned to the nav objects by the SSNav class. startShow can be used to begin the slideshow. startShow is called in source file 305 after all the initialization and instantiation has been completed.

SSNav class 302 can be the code object that handles the functionality of the menu, which the NavMenu class 304 handles the drawing of. Class 302 can include its constructor, SSNav, which can initialize its member variables and settings. setLeftNav and setRightNav can be used to specify the objects that will handle the navigation to the previous and next slides. These functions map the goNextSlide and goPrevSlide functions of class 301 to the objects that will handle the previous and next slide navigation. The setListener method can set the object in which will listen for input. hideNavBar can be used to animate the hiding of the menu bar. The showNavBar method can be used to animate the display of the menu bar. checkSlide can be used to check the height of the current slide. The updateNavBar method can be used to update the menu bar after the current slide has been updated.

MenuFormat class 303 can be responsible for drawing the menu bar. Class 303 can include its constructor, MenuFormat, which can initialize its member variables and settings. The drawMenuBack and drawSectionBack methods can be used for drawing the menu bar background. The setSectionWidths and setMenuWidths methods can be used to specify the widths for each element of the menu bar. The executeChapterRollOver and executeChapterRollOut methods can be mapped to mouse actions of the menu bar to be executed when the mouse rolls over or out of the menu bar respectively. The executeSectionRollOver and executeSectionRollOut methods can be methods that refer to sub-menus in the menu structure. They can function in a manner similar to executeChapterRollOver/Out, except they are able to refer to a submenu, which is shown when a chapter menu item is rolled over.

NavMenu class 304 can be responsible for the management of the menu bar's data. Class 304 can include its constructor, NavMenu, which can initialize its member variables and settings. First, the initMenu method can be used in source file 305 to generate the contained menu bar according to the defined settings. The addChapter method can add a menu item to the menu with the passed in label and linkage identifier for the content that the menu item will load when pressed. The getSlideArray and getChapterArray methods can be used to access the internal private members containing the slide and chapter array respectively. The createChapterText and createSectionText methods can create the dynamic text labels for the menu. Neither is used for displaying actual content. The createSectionButton and createChapterButton methods can be used to generate the dynamically sized and positioned buttons for the menu depending on the arguments passed in. These buttons can also be assigned to load the specified content associated with that menu item.

Source file 305 can include definitions, class import, and object instantiations. The definitions in source file 305 can include the individual settings for the generated menu-driven slideshow. Source file 305 can begin by importing the menu slideshow framework classes. Source file 305 can then create new instances of each class 301-304 and pass configuration values to each. Source file 305 can then run startShow of class 301.

Appendix A includes a further elaboration (i.e., provides a more robust implementation example of the MSF) than the classes shown in FIG. 3. It is provided for illustrative purposes only and the specifics expressed in Appendix A are not to be construed as a limitation of the scope of the invention described herein. Appendix A is being submitted separately on a compact disc in accordance with MPEP §1.96(c).

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising:
at least one non-transitory storage medium;
at least one code object written in an object oriented language and digitally encoded in the at least one non-transitory storage medium, said at least one code object defining at least one class define reusable menuing functionality for menus configured to interactively navigate among a plurality of linearly ordered self-contained software objects, wherein said classes are configured to be imported into a source file, where said source file is configured to be placed in a project file that also includes a plurality of custom linearly ordered self-contained software objects, which are bound to interactive menus having functionality provided by the at least one class, wherein each of the said self-contained software objects is programmatically linked to said at least code object without modifying source code of the self-contained software object, wherein said at least one code object defines a linear ordering of the self-contained software objects.

2. The computer program product of claim 1, wherein each of the at least one class is an actionscript class, wherein each self-contained software object is a FLASH content object, and wherein the project file is a compilable software object for a slideshow configured to utilize the menuing functionality.

3. The computer program product of claim 1, wherein said at least one class is configured to accept calls with passed arguments, wherein values of arguments conveyed in the calls of the source code define content loading and unloading, menu labels, a menu color scheme, and menu placement for said menus.

4. The computer program product of claim 1, wherein said at least one class comprises a DemoSlideShow class, a SSNav class, a NavMenu class, and a Menu Format class.

5. The computer program product of claim 1, wherein said at least one class comprises a DemoSlideShow class, wherein said DemoSlideShow class comprises at least two methods selected from a group of methods consisting of a loadContent method, an executeSlide method, a goNextSlide method, and a goPreviousSlide method.

6. The computer program product of claim 1, wherein said at least one class comprises a SSNav class, wherein said SSNav class comprises at least three methods selected from a group of methods consisting of a setLeftNav method, a SetRightNav method, a setListener method, a hideNavBar method, a ShowNavBar method, a checkSlide method, and an updateNavBar method.

7. The computer program product of claim 1, wherein said at least one class comprises a NavMenu class, wherein said NavMenu class comprises at least three methods selected from a group of methods consisting of an addChapter method, a getSlideArray method, a getChapterArray method, an initMenu method, a createChapterText method, a createSectionText method, a createSectionButton method, and a createChapterButton method.

8. The computer program product of claim 1, wherein said at least one class comprises a MenuFormat class, wherein said MenuFormat class comprises at least three methods selected from a group of methods consisting of a drawMenuBack method, a drawSectionBack method, a setSectionWidths method, a setMenuWidths method, an executeChapterRollOver method, an executeChapterRollOut method, an executeSectionRollOver method, and an executeSection Rollout method.

* * * * *